United States Patent [19]

Hwang et al.

[11] Patent Number: 5,653,838

[45] Date of Patent: Aug. 5, 1997

[54] GLASS HEATING AND SEALING SYSTEM

[75] Inventors: Ming-Jang Hwang; Chi-Cheong Shen, both of Richardson; Cecil J. Davis, Greenville; Robert T. Matthews, Plano, all of Tex.; Phillip Chapados, Jr., Hilton, N.Y.

[73] Assignee: Texas Instruments Incorporated, Dallas, Tex.

[21] Appl. No.: 535,423

[22] Filed: Sep. 28, 1995

[51] Int. Cl.$^6$ .................................................. B32B 31/24
[52] U.S. Cl. ...................... 156/104; 156/107; 156/272.2; 156/273.3; 156/286; 156/382
[58] Field of Search ................................. 156/104, 107, 156/272.2, 273.3, 286, 382

[56] References Cited

U.S. PATENT DOCUMENTS

| | | | |
|---|---|---|---|
| 3,995,941 | 12/1976 | Nagahara | 65/33 |
| 4,637,850 | 1/1987 | Suzuki . | |
| 4,643,532 | 2/1987 | Kleiman | 65/36 |
| 4,655,811 | 4/1987 | Bitter . | |
| 4,788,471 | 11/1988 | Strauss . | |
| 4,826,463 | 5/1989 | Strauss . | |
| 5,223,001 | 6/1993 | Saeki . | |
| 5,326,420 | 7/1994 | Vinouze . | |
| 5,464,490 | 11/1995 | Sato . | |
| 5,492,582 | 2/1996 | Ide . | |
| 5,592,288 | 1/1997 | Sampica . | |

*Primary Examiner*—Jenna Davis
*Attorney, Agent, or Firm*—Warren L. Franz; Wade James Brady, III; Richard L. Donaldson

[57] ABSTRACT

A glass heating and sealing system (10, 30, 60) and method for manufacturing a flat panel display including anode and cathode glass panels with a vacuum compartment between them includes a plurality of vacuum chambers (12, 14, 16, 18, 20, 32, 34, 36, 38, 61, 76) for processing glass panels (39, 63, 74). Transfer of glass panels (39, 63, 74) between chambers (12, 14, 16, 18, 20, 32, 34, 36, 38, 61, 76) is accomplished by a transfer mechanism (24, 42, 68, 72) located within a central vacuum chamber (22, 40, 70) commonly connected to the other chambers. System (10, 30, 60) may include a rapid thermal processing (RTP) chamber (14, 34, 38, 76) for quick and even heating of the panels (39, 63, 74). System (10) includes an e-beam bombardment chamber (16) for preconditioning the anode glass panels, and a heating chamber (18) for fusing anode glass panels to cathode glass panels. Different levels of vacuum may be established in different chambers.

13 Claims, 2 Drawing Sheets

GLASS HEATING AND SEALING SYSTEM

BACKGROUND OF THE INVENTION

Flat panel displays are used to present visual information to the user. Such displays may be used for example on notebook computers. LCD panels have been used in the past. A more recent flat panel design is the field emission display. Field emission display units include two panels of glass with a vacuum compartment between them containing a number of components. One panel of glass is the anode, which has a phosphor layer, and the other is the cathode. The application of a voltage at discrete control gates between the panels causes an electron flow that causes a portion of the phosphor layer to glow as desired. To manufacture such displays, the two pieces of glass must be brought together and fused about their end portions.

One technique that has been used for preparing flat panel displays is to fuse the panels using heat in a large, single chamber assembly furnace. Such assembly furnaces have multiple stages within the single chamber and each stage has a different temperature. Because of the occurrence of cracks in a panel caused by internal stresses when uneven and quick heating of the glass panel occurs, the assembly furnaces have the multiple stages to gradually heat the panels. The panels pass through the multiple stages and the temperature is raised at each stage so that at the final stage the temperature is at the desired level. These large, single chamber furnaces may have as many as four or five glass panels in them at any one time.

Different processing steps may occur at each stage in the furnace. For example, at an intermediate stage, an e-beam bombardment may occur, which is a process of preconditioning a panel. If at any processing step within the large, single chamber assembly furnace, there is a failure or contamination, all of the glass panels within the large vacuum cavity may have to be discarded. Additionally, with the large, single chamber assembly for flat panels, the entire chamber may have to be pumped out to create the vacuum that is required by the processing step that needs the greatest vacuum.

SUMMARY OF THE INVENTION

In accordance with the present invention, disadvantages and shortcomings associated with previously used systems have been substantially reduced or eliminated by use of the present glass heating and sealing system.

A glass heating and sealing system is provided that includes a plurality of chambers for processing glass panels and a transfer mechanism for moving the glass panels between the plurality of chambers.

In accordance with another aspect of the present invention, at least one chamber of the heating and sealing system is a rapid thermal processing (RTP) heating chamber.

In accordance with another aspect of the present invention, a method for manufacturing glass panels is provided that includes heating an anode glass panel in a first rapid thermal processing heating chamber and fusing the anode panel with a cathode glass panel.

A technical advantage of the present invention is that each chamber needs only be pumped out to create the necessary vacuum for that particular processing step of the chamber, which increases the throughput of the system. Another technical advantage of the present invention is that there are no moving parts interconnecting the chambers which makes contamination less likely. Another technical advantage of the present invention is that it is easier to maintain, and if a chamber of the system of the present invention is contaminated, only one glass panel would need to be scrapped as opposed to numerous ones in systems previously known. Additionally, only one component or station would need to be replaced in the event of a breakdown.

Another technical advantage of the present invention is that rapid thermal processing (RTP) is used to heat the glass panels in a uniform manner which allows for quick heating. This again increases the throughput of the system and minimizes the possibility of cracks. Another technical advantage of the present invention is that it has a smaller footprint than previously known systems because only one chamber is needed to raise the temperature of the glass panels.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
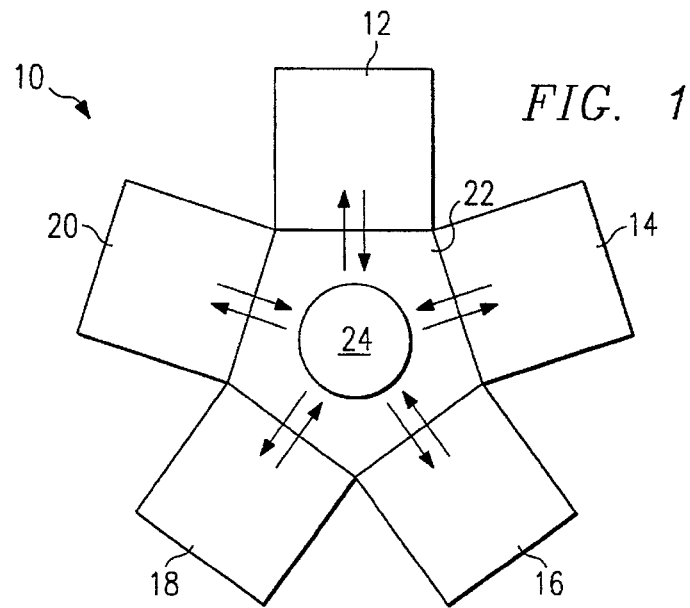
FIG. 1 is a schematic diagram of one embodiment of the present invention.
Figure 2:
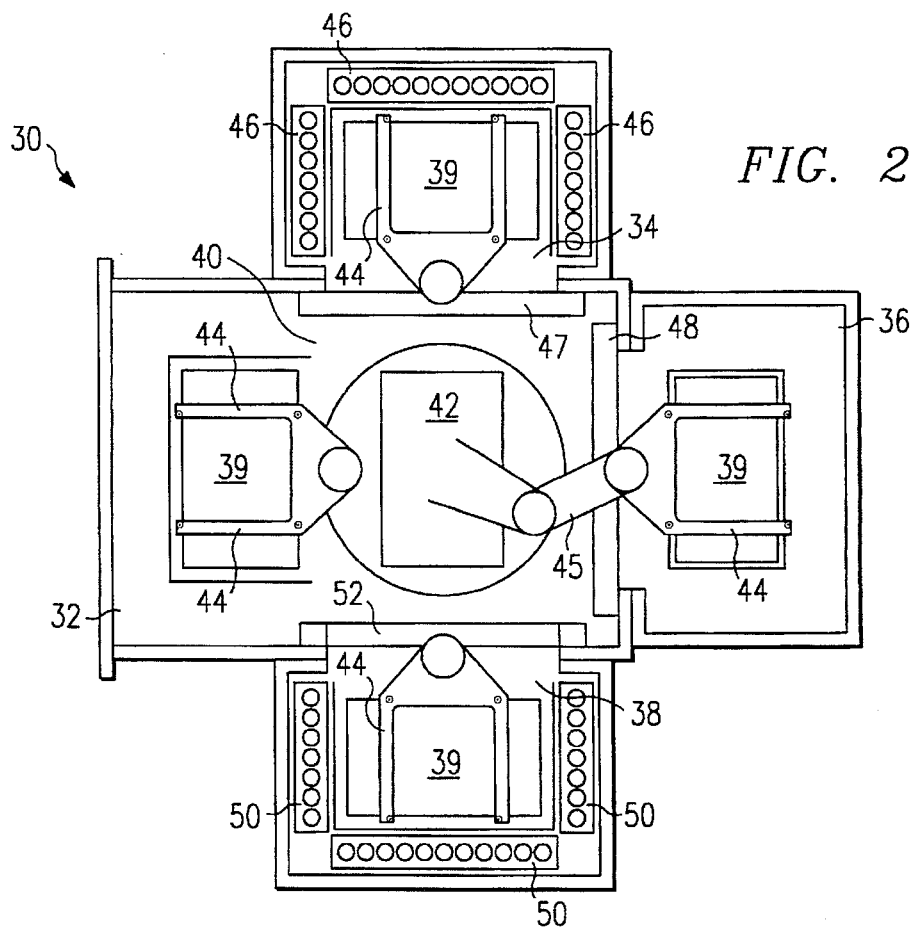
FIG. 2 is a schematic plan view of a second embodiment of the present invention.
Figure 3:
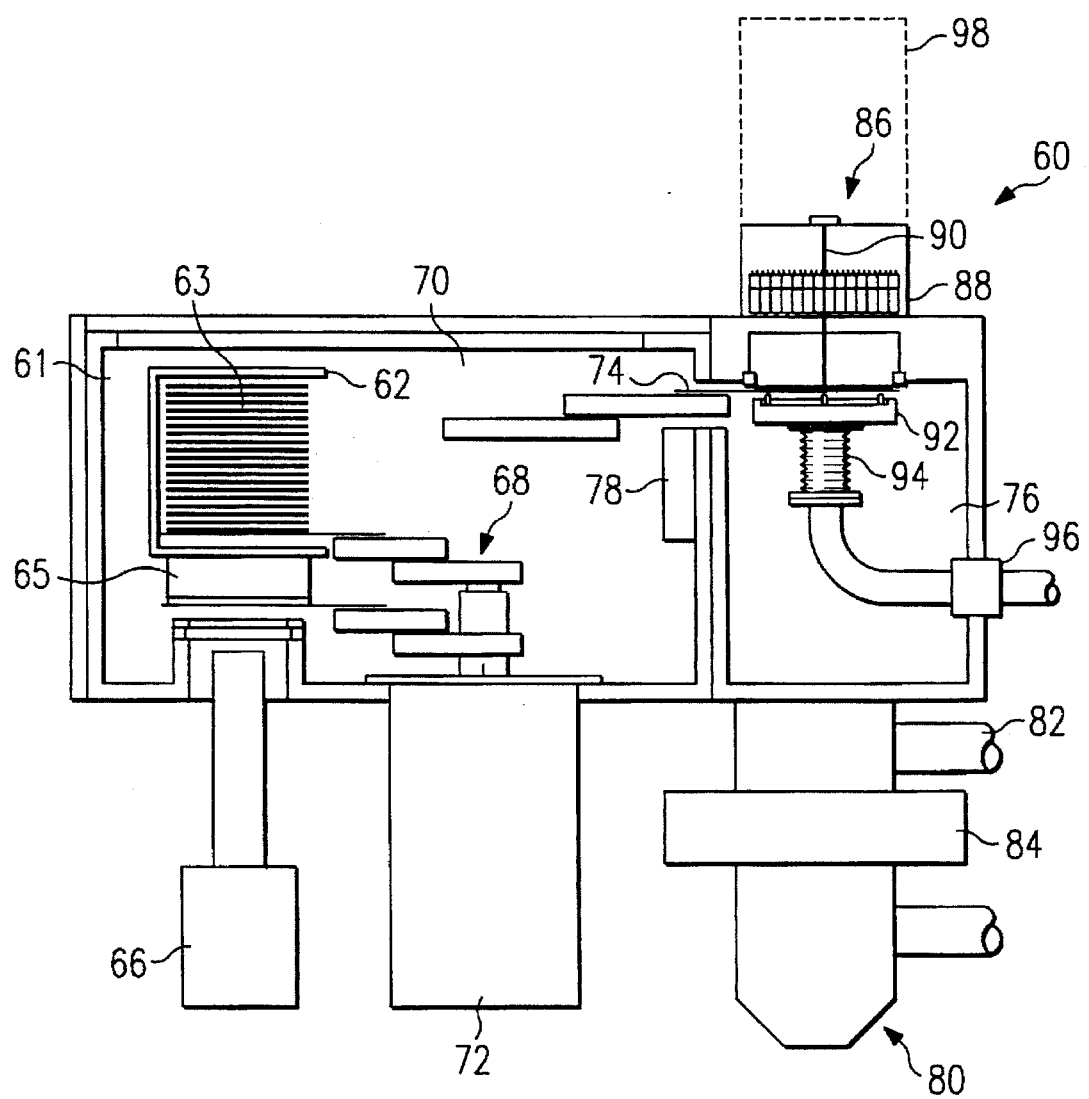
FIG. 3 is an elevational view of a portion of one embodiment of the present invention.

The preferred embodiments of the present invention and their advantages are best understood by referring to FIGS. 1–3 of the drawings, like numerals being used for like and corresponding parts of the various drawings.

Referring to FIG. 1, a glass panel processing system 10 is shown. System 10 includes first, second, third, fourth and fifth chambers 12, 14, 16, 18, 20 and a central chamber or area 22. Central chamber 22 includes a transfer mechanism 24 such as a robot or system of transfer arms. Transfer mechanism 24 is for moving glass panels between chambers 12, 14, 16, 18, 20 and 22.

Different processing steps can occur in each chamber. Chamber 12 is a loading chamber, where the anode glass can be introduced into system 10. The anode glass entered in chamber 12 is then transferred by transfer mechanism 24 into chamber 22 and then into chamber 14. In chamber 14, the anode glass is heated preferably using a rapid thermal process (RTP) which may include an IR lamp and optical pyrometer. The RTP will uniformly and quickly bring the glass panel to the desired temperature.

Transfer mechanism 24 then moves the anode glass from chamber 14 to chamber 22 and then to chamber 16 where it is preconditioned using e-beam bombardment. Once conditioned in chamber 16, transfer mechanism 24 will move the anode glass into chamber 22 and then to chamber 18, which is another heating chamber (heated by RTP). The anode glass panel will be fused with a cathode glass panel in chamber 18.

The cathode glass panel can be introduced at loading chamber 20 and transported by transfer mechanism 24 into chamber 18 (via chamber 22) where it is fused with the anode glass. Once the flat panel is created from the sealing of the anode glass and the cathode glass, transfer mechanism 24 will remove the glass panel from chamber 18 and return it to chamber 20 where it can be removed from the system.

The embodiment of FIG. 1 shows five chambers 12, 14, 16, 18, 20 and a central chamber 22. Each of the chambers may have different vacuum requirements for the processing occurring at the station, and only the required vacuum will be produced in each chamber which minimizes the time required to pump down the vacuum. For example, if the chamber only needs a small vacuum, only a small amount of pumping will be required. Additionally, the glass need not be moved through multiple stages in order to heat it because of the use of RTP. This first embodiment could be rearranged to include a different number of chambers as the components and processing steps are combined in different ways; for example, the embodiment of FIG. 2 has four chambers.

Referring now to FIG. 2, a second embodiment of a glass panel processing system 30 according to an aspect of the present invention is shown. System 30 has a first chamber 32, second chamber 34, third chamber 36 and fourth chamber 38. First chamber 32 is the load lock having a separate pump out for purposes of vacuum. Glass panels 39 are both loaded and unloaded from chamber 32.

System 30 includes a center portion or chamber 40 containing a transfer mechanism or robot 42. Pick arm 44 in combination with transfer mechanism 42 is capable of moving glass plates about the different chambers in system 30. Transfer mechanism 42 uses a movable arm 45 in connection with pick arm 44 to move glass panels 39. Movable arm 45 is only shown connected to pick arm 44 in chamber 36, but it is understood that any number of movable arms 45 may be used with transfer mechanism 42 to quickly move pick up arms 44 into and out of chambers 32, 34, 36 and 38. Transfer mechanism 42 may also include a rotatable table or other means for transferring work pieces as may be known in the art.

Turning to chamber 34 of the second embodiment, chamber 34 is a heating chamber containing heater elements 46 which may be conventional resistive, coil type heaters. Located on top of chamber 34 is a heating module with optical pyrometer for RTP (see 86 in FIG. 3). A gate 47 seals chamber 34 to allow a vacuum to be created within chamber 34 as the gas in chamber 34 is pumped out. Other processing may occur in chamber 34 such as preconditioning.

Chamber 36 is an assembly chamber having a separate pump out mechanism. Gate 48 seals chamber 36 to allow the chamber to be evacuated. The cathode and anode glass plates are fused about their perimeter within this chamber.

Chamber 38 is another heating chamber containing heating elements 50, which may be resistive, coil type heaters and containing an RTP type heater on top of chamber 38 (see 86 in FIG. 3). Chamber 38 is sealed by gate 52. The final product is removed or unloaded through chamber 32. Other chambers can be added to system 30 or fewer chambers used as the processing steps may be combined.

Referring now to FIG. 3, there is shown a portion of a glass processing system 60 according to an aspect of the present invention, and in particular, loading chamber 61 and a heating chamber 76 are shown. Cassette 62 contains top and bottom glass panels or substrates 63. An electrostatic clamp 65 and inspection camera 66 may be included in chamber 61. Glass substrates 63 from cassette 62 are transferred by transfer arms 68 which provide for rotation within chamber 70 as well as the ability to be elevated to different levels by a robot or transfer mechanism 72.

A glass panel from panels 63, such as glass plate 74, may be inserted into chamber 76 which is in this instance a heating chamber. Once inserted in chamber 76, gate 78 may be closed so that the glass in chamber 76 may be pumped out through vacuum pump 80. Vacuum pump 80 includes a number of inlets, such as 82 which provide access to the pump and a valve 84 for controlling pump 80. An RTP unit 86 is attached to the top of chamber 76. RTP unit 86 includes IR lamp 88 and optical pyrometer 90. Glass panel 74 may be placed on an actuator clamp 92 which is above a bellows drive 94. Bellows drive 94 is activated through a feedthrough 96. Glass plate 74 is thus held in place while being heated through the RTP process which allows for quick and even heating of glass panels 63. FIG. 3 shows one example of a transfer between chambers 61, 70 and 76, transfer between other chambers as demonstrated in previous figures is conducted in an analogous or identical manner; for example, an e-beam unit or column 98 may be attached to the top of a chamber as shown by the hidden lines of FIG. 3.

Although the present invention and its advantages have been described in detail, it should be understood that various changes, substitutions and alterations can be made therein without departing from the spirit and scope of the invention as defined by the appended claims.

What is claimed is:

1. In a method of manufacturing glass panel displays comprising preconditioning an anode glass panel including a phosphor layer, then fusing the preconditioned anode glass panel together with a cathode glass panel in a vacuum, the improvement comprising the steps of:

placing the anode glass panel in a first vacuum chamber;

heating the anode glass panel in the first vacuum chamber;

transferring the anode glass panel, under vacuum, from the first vacuum chamber to a second vacuum chamber;

placing a cathode glass panel adjacent to the anode glass panel in the second vacuum chamber; and fusing the cathode glass panel and the anode glass panel in the second vacuum chamber.

2. The improvement of claim 1, further comprising the steps of preconditioning the anode glass panel by e-beam bombardment in a third vacuum chamber prior to said fusing step; and transferring the anode glass panel, under vacuum, to one of said first and second vacuum chambers after said preconditioning.

3. The method of claim 2, wherein the transferring steps comprise using a transfer mechanism located within another vacuum chamber commonly connected to the first and second vacuum chambers to move the anode glass panel between chambers.

4. The method of claim 3, further comprising the step of creating different vacuum levels in different ones of the chambers.

5. A method of manufacturing a flat panel display having anode and cathode glass panels brought together and fused under vacuum, the anode panel including a phosphor layer, and the method comprising:

providing a plurality of vacuum chambers commonly connected to a central vacuum chamber;

providing a glass panel transfer mechanism within said central vacuum chamber;

using said transfer mechanism, moving an anode glass panel through said central vacuum chamber to a first one of said vacuum chambers;

heating said anode glass panel in said first vacuum chamber;

using said transfer mechanism, moving said heated anode glass panel through said central vacuum chamber, between said first and second vacuum chambers;

preconditioning said heated anode panel by e-beam bombardment in said second vacuum chamber;

using said transfer mechanism, transferring said bombarded anode glass panel through said central vacuum chamber, to a third one of said vacuum chambers; and fusing said bombarded anode glass panel with a cathode glass panel in said third vacuum chamber to form a flat panel display.

6. The method of claim 5, further comprising heating said bombarded anode glass panel in said third vacuum chamber.

7. The method of claim 6, wherein at least one of said heating steps is performed using rapid thermal processing.

8. The method of claim 6, wherein at least one of said heating steps is performed using an IR lamp and an optical pyrometer.

9. The method of claim 5, further comprising:

loading said anode glass panel into a loading chamber connected to said central vacuum chamber; and using said transfer mechanism, transferring said loaded anode glass panel through said central vacuum chamber, between said loading chamber and said first vacuum chamber.

10. The method of claim 9, further comprising:

loading said cathode glass panel into a second loading chamber connected to said central vacuum chamber; and using said transfer mechanism, transferring said loaded cathode glass panel through said central vacuum chamber, between said second loading chamber and said third vacuum chamber.

11. The method of claim 10, further comprising:

using said transfer mechanism, transferring said display through said central vacuum chamber, between said third vacuum chamber and one of said loading chambers; and removing said display from said one loading chamber.

12. The method of claim 5, further comprising independently controlling the vacuum in each chamber.

13. The method of claim 5, wherein said heating is performed using rapid thermal processing.

* * * * *

UNITED STATES PATENT AND TRADEMARK OFFICE
CERTIFICATE OF CORRECTION

PATENT NO. : 5,653,838
DATED : Aug. 5, 1997
INVENTOR(S) : Ming-Jang Hwang, et al It is certified that error appears in the above-identified patent and that said Letters Patent is hereby corrected as shown below:

Title page, insert the following:

--Related U.S. Application Data
Item [60] Provisional application No. 60/002,754, Aug. 24, 1995

Column 1, line 2, insert the following:

--CROSS REFERENCE TO RELATED APPLICATION
Reference is made to and priority claimed from U.S. Provisional application Ser. No. US 60/002,754, filed Aug. 24, 1995, entitled GLASS HEATING AND SEALING SYSTEM.--

Signed and Sealed this

Fifteenth Day of June, 1999

Attest:

Q. TODD DICKINSON

Attesting Officer    Acting Commissioner of Patents and Trademarks